Nov. 28, 1967 — J. O. HELVERN — 3,354,641
PEDAL LIFT MECHANISM
Filed Aug. 26, 1965 — 2 Sheets-Sheet 1

INVENTOR.
James O. Helvern
BY
Donald P. Schacki
HIS ATTORNEY

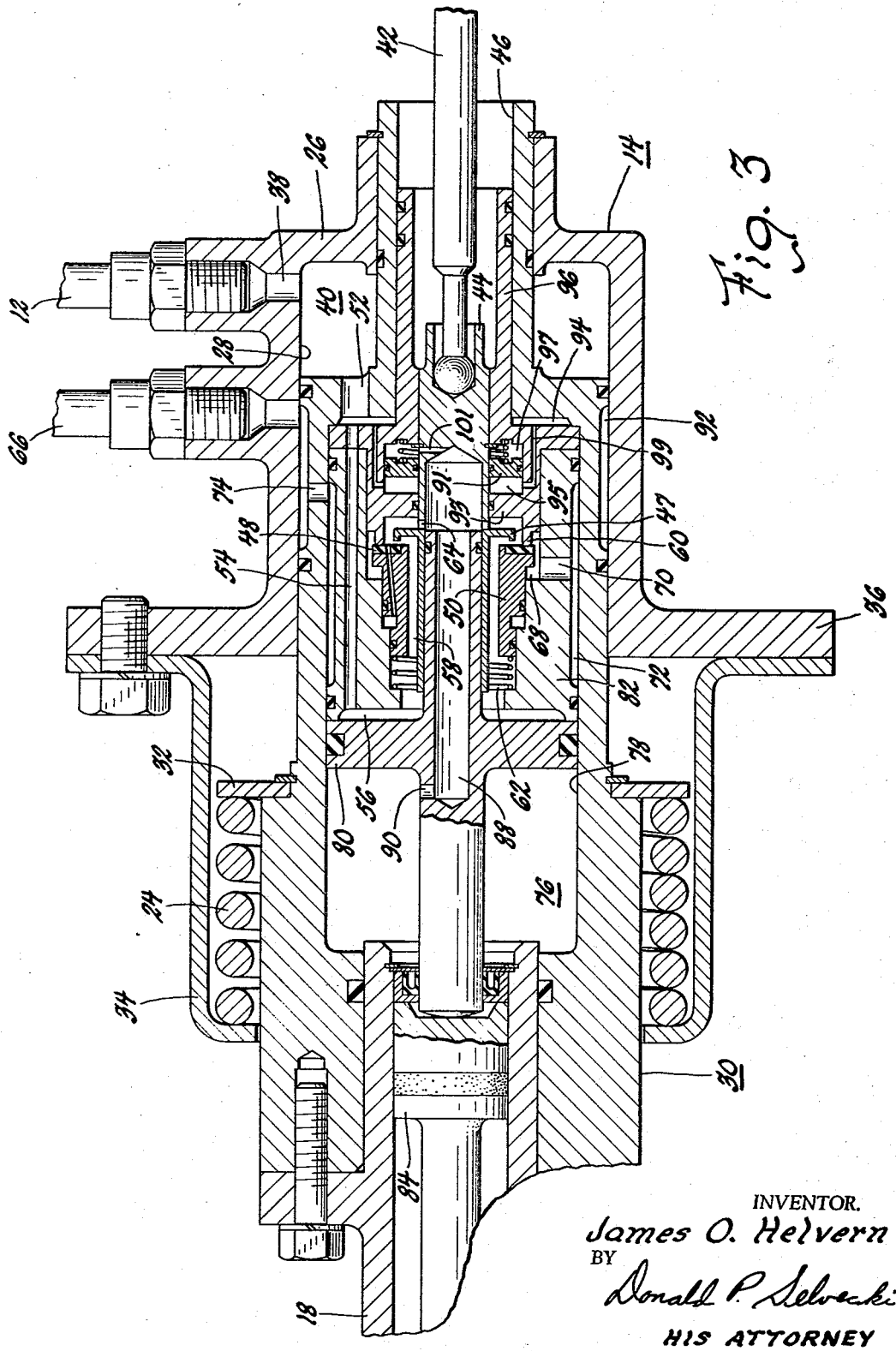

United States Patent Office 3,354,641
Patented Nov. 28, 1967

3,354,641
PEDAL LIFT MECHANISM
James O. Helvern, Lewisburg, Ohio, assignor to General Motors Corporation, Detroit, Mich., a corporation of Delaware
Filed Aug. 26, 1965, Ser. No. 482,727
7 Claims. (Cl. 60—54.6)

ABSTRACT OF THE DISCLOSURE

In a preferred form, this invention relates to an automatic brake pedal lifting mechanism which functions to raise the brake pedal in a zero travel power braking system to a high point relative to the vehicle toeboard when a pressure failure occurs in part of the braking system and a higher brake position is desirable.

---

This invention relates to vehicle braking systems and more particularly to a power brake booster having a brake pedal normally disposed near the toeboard of a vehicle but which automatically repositions the brake pedal to a higher position when pressure is lost in a power booster.

Power brake boosters very often are operable with very little pedal movement. Consequently, brake pedals used with power boosters can be located near the toeboard of a vehicle in order to avoid clutter in the driving compartment thereof. A problem arises in an installation of this kind when pressure is lost in the booster and manual operation of the master cylinder through the booster is necessitated. The amount of required fluid displacement in a master cylinder generally requires greater travel of a brake pedal acting directly on the master cylinder than when the low travel booster is power operated. Therefore, it is extremely desirable to automatically reposition a brake pedal to a higher position relative to a vehicle toeboard when booster power is lost and greater pedal travel is required.

It is an object of the present invention to provide an improved power brake booster which automatically repositions a brake pedal a greater distance from a vehicle toeboard than when the booster has a powered capability.

It is another object of the present invention to provide an improved power brake booster wherein the valving mechanism engaging the brake pedal is integrally formed with an hydraulic master cylinder which is repositioned with the valving mechanism when a power failure occurs and greater brake pedal travel is necessitated.

It is a further object of the present invention to provide an improved power brake booster which uses very little additional space to carry out the aforementioned objects and which is therefore economical to manufacture and which has a minimum number of operating parts.

Further objects and advantages of the present invention will be apparent from the following description, reference being had to the accompanying drawings wherein a preferred embodiment of the present invention is clearly shown.

In the drawings:

FIGURE 3 is a sectional view of the booster of FIGURE 1.

Figure 1:
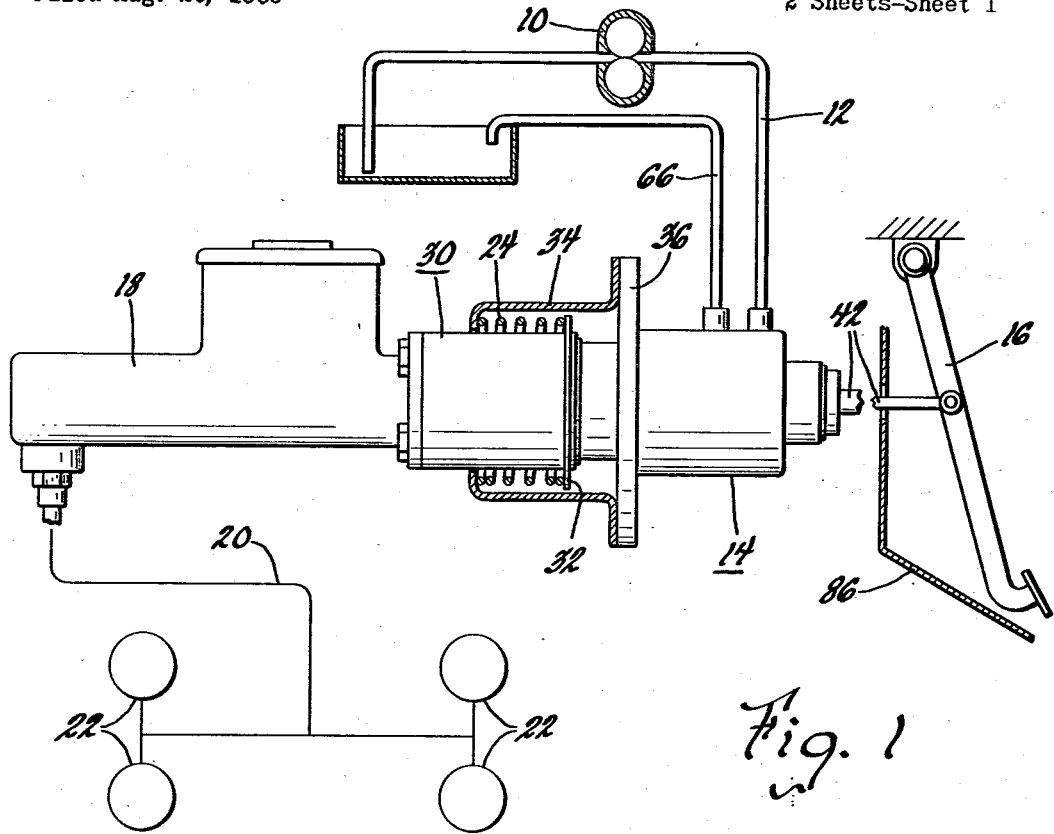
FIGURE 1 is a diagrammatic illustration of a vehicle braking system showing the invention in a configuration it assumes during powered operation of the associated booster.
Figure 2:
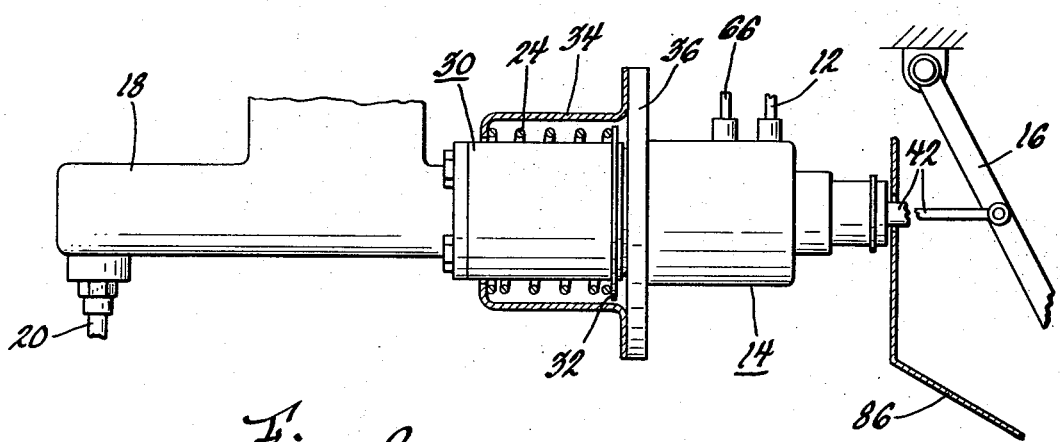
FIGURE 2 is a diagrammatic illustration of a vehicle braking system showing the invention in a configuration it assumes during unpowered operation of the associated booster.

Referring to FIGURE 1, a fluid pump 10 supplies fluid under pressure through line 12 to booster 14. Booster 14 is actuated in any well-known manner by a pivoted brake pedal 16 and results in an internal build-up of pressure which is transmitted to master cylinder 18 and ultimately through brake lines 20 to wheel brakes 22. Pedal raising spring 24 is shown compressed in FIGURE 1 and this is the position spring 24 assumes when power is had in the booster from pump 10. Spring 24 is illustrated in FIGURE 2 in an extended disposition which is the position it assumes when pressure from pump 10 is not supplied to booster 14. It is noted in FIGURE 2 that brake pedal 16 has been raised to a higher position and the method of bringing this about will be hereinafter described.

Referring to FIGURE 3, the booster, generally designated by numeral 14, comprises a booster body 26 having a bore 28 formed therein. Valve means, generally designated by numeral 30, is slidable in bore 28 and includes a circumferentially disposed stop 32 against which spring 24 bears. Spring 24 is retained by retainer 34 and by stop 32 constantly urging valve means 30 toward upstanding flange 36 of body 26.

Line 12 from pump 10 communicates fluid under pressure to inlet 38. Chamber 40, formed on one side of valve means 30 in bore 28, provides a pressure against said valve means and, consequently, spring 24, to keep spring 24 compressed against retainer 34. Booster 14 is of a type generally known as a low or zero travel type booster. A simple description of the booster operation follows.

Push rod 42 drivably connected with brake pedal 16 engages valve 44 slidably disposed in bore 46 of valve means 30. Flange 47 of valve 44 is engageable with seat 48 carried on sliding valve body 50 to selectively cut off fluid communication from chamber 40, it being clear that a path for fluid communication from chamber 40 exists through passage 52 and passage 54 into chamber 56 and ultimately through passage 58. Valve body 50 is normally maintained against seat 60 by spring 62 preventing the relief of pressure in passage 58 and chamber 64 to return line 66 through chamber 68, passage 70, chamber 72 and passage 74.

Balance chamber 76 is disposed in bore 78 of valve means 30 and maintains power piston 80 in engagement with valve body 82. Power piston 80 drivably engages piston 84 of hydraulic master cylinder 18 to provide a displacement of fluid therein through lines 20 to brakes 22.

A reaction piston 91 is slidably mounted between valve 44 and valve body 50 with stationary wall 93 on its left side. It will be seen that the pressure in chamber 95 is the same as that in chamber 94 because of passage 99 and the pressure in chamber 97 is the same as that in 56 because of fluid communication through passage 101. Therefore, as the brakes are applied, the reaction piston is urged to the right, contacts a retaining ring on valve 44 and tends to apply a resisting force on the pedal proportional to the pressure differential in chamber 94 and 56 thus providing a pedal "feel" for the operator.

In operation, it will be assumed that fluid pump 10 is providing sufficient pressure to booster 14 as would be the situation in a vehicle with the engine running. It is noted hat brake pedal 16 is disposed relatively near toeboard 6. Referring to FIGURE 3, when it is desired to actuate he vehicle brakes, push rod 42 engaging valve 44 receives force from the brake pedal 16, sometimes referred to erein as force input means. The initial movement of alve 44 carries flange 47 into engagement with seat 48 preventing further pressure communication between passage 58 and chamber 64. It is seen that chamber 64 is ntegrally formed with passage 88 and passage 90 freely communicating fluid under pressure to balance chamber 76.

Further movement of valve 44 results in the movement of valve body 50 against the bias of spring 62 out of engagement with seat 60. When this occurs, chamber 64 comes into pressure communication with chamber 68 and a path for pressure relief is had through passage 70, chamber 72, passage 74 and chamber 92 to return line 66. When balance chamber 76 loses pressure, the pressure from inlet 38 continues to build up in chamber 56, thereby displacing fluid thereinto and moving power piston 80 and engaged piston 84 leftwardly, as viewed in FIGURE 3. When a certain amount of movement has occurred with power piston 80, pressure builds up in passage 58 causing the reseating of valve body 50 against seat 60. A pressure build-up also occurs in chamber 94 resulting in valve member 96 acting against seat 48 to drive valve body 50 out of engagement with flange 47. This restores fluid communication to chamber 60 around flange 47 resulting in a build-up of pressure in balance chamber 76 restricting movement of power piston 80.

The release of the input force from push rod 42 results in a displacement to the right of valve 44, thereby returning the pedal to the poised position. The area in balance chamber 76 is greater than the area in chamber 56 and power piston 80 will follow the movement of valve 44 causing valve member 96, valve body 50 and valve body 82 to be returned to their normal operative positions.

When pressure is lost in the booster due to the failure of pump 10 or a break in the pressure supply lines, pressure will be lost in chamber 40 almost immediately. It is understood that, during periods of normal pressurization, the pressure in chamber 40 acts against valve means 30 carrying stop 32 to depress spring 24 against retainer 34. Therefore, when pressure is lost in chamber 40, spring 24 becomes the dominant force acting on valve means 30 resulting in a displacement of valve means 30 into chamber 40. Thereafter, push rod 42 is driven to the right, as viewed in FIGURE 3, by the movement of valve means 30 acting through piston 80 and valve body 50 to valve 44, resulting in a pivoting of brake pedal 16 to a higher position relative to toeboard 86. Brake applications are still possible during this condition of operation by direct force transmission from brake pedal 16 through push rod 42, the valving mechanism 44 in valve means 30 and power piston 80 to piston 84 of master cylinder 18. Previously, only a small amount of travel of pedal 16 resulted in the repositioning of the internal valving mechanism to bring about the displacement of power piston 80 in balance chamber 76. When pressure is lost and direct force transmission is necessary, pedal 16 must travel a sufficient distance to allow power piston 80 to be driven in chamber 76 to actuate master cylinder 18. The high positioning of the pedal relative to toeboard 86 accommodates the need for the extra pedal travel required.

The subject invention has particular utility in a hydraulic operated booster of the type described but it is understood that other types of fluid pressure actuated boosters are readily adaptable for incorporation of the subject invention to give them a pedal raising capability. The particular booster chosen for illustration purposes represents an hydraulic fluid operated booster which sets up an environment for the subject invention of a type that is normally most difficult to operate in an unpowered condition. Certain other types of boosters are easier adapted with a pedal raising capability.

While the embodiment of the present invention, as herein disclosed, constitutes a preferred form, it is to be understood that other forms might be adopted.

What is claimed is as follows:

1. A brake pedal lift mechanism for a power brake booster, said mechanism comprising: a booster body having an inlet from a pressure source and an outlet to a reservoir; valve means slidably disposed in said booster body and arranged to control pressure communication between said inlet and outlet; force input means engaging said valve means for repositioning thereof; power output means slidably carried in said valve means and responsive to pressure routed from said inlet by said valve means to provide a power boost to a force provided by said force input means; and valve positioning means for maintaining a predetermined force against said valve means from one side in said booster body which is normally overcome by pressure from a pressure source thereby keeping said valve means and said force input means at a first predetermined position, said valve positioning means arranged to move said valve means and said force input means toward a second predetermined position as pressure at said inlet decreases below a minimum working pressure of the booster.

2. A brake pedal lift mechanism according to claim 1 wherein said valve positioning means includes a spring acting against said valve means, and a chamber formed between an opposite side of said valve means and said valve body, said chamber being in fluid communication with said inlet and being normally pressurized an amount sufficient to compress said spring and maintain said valve means and engaged power input means at one extreme of movement.

3. A brake pedal lift mechanism according to claim 1 wherein said power output means is a piston slidable in said valve means and normally having equal pressure from said inlet disposed on either side thereof, said piston being movable in response to a pressure decrease on one side of said piston, said piston following said valve means to an opposite extreme of movement from a normal position in said booster body upon a pressure decrease on both sides of said valve means, said piston means being movable by direct force transmission from said force input means when said valve means is in the said opposite extreme of movement.

4. A brake pedal lift mechanism for an hydraulically powered vehicle braking system, said mechanism comprising: a fluid pressure source; a booster body including a bore carried by the vehicle in fluid communication with said fluid pressure source; valve means slidably carried in said booster body bore and being held in a first extreme of sliding movement in said bore by fluid pressure from said fluid pressure source; a brake pedal drivably engaging said valve means and being pivotally supported by the vehicle, said brake pedal pivoted by the positioning of said valve means by fluid pressure to a low position relative to the vehicle toeboard; and spring means engaging said valve means and said booster body for urging said valve means toward a second extreme of sliding movement in said bore against the fluid pressure, said fluid pressure overcoming the bias of said spring means to maintain said valve means in the first extreme of sliding movement while the minimum booster working pressure is exceeded, said spring means becoming the dominant force acting on said valve means when system pressure is below the minimum booster working pressure thereby repositioning said valve means to said second extreme of sliding movement to raise the brake pedal from the toeboard for unpowered booster operation.

5. A brake pedal lift mechanism according to claim 4 wherein a hydraulic master cylinder is carried by said valve means and slidable therewith into two extremes of sliding movement in the bore of said booster body.

6. A brake pedal lift mechanism according to claim 4 wherein said valve means is operatively positionable at an infinite number of points intermediate the extremes of sliding movement within the bore of said booster body thereby adapted for raising the brake pedal to an infinite number of points intermediate a low and a high position relative to the vehicle toeboard.

7. A brake pedal lift mechanism according to claim 6 wherein the spring means is of a sufficient strength in the extended position to resist a compressive force applied by an operator on the brake pedal during a brake actuation in the unpowered condition.

References Cited

UNITED STATES PATENTS 3,120,156   9/1962   Ayers _____ 91—391

MARTIN P. SCHWADRON, *Primary Examiner.*

PAUL E. MASLOUSKY, *Examiner.*